Patented Jan. 19, 1943

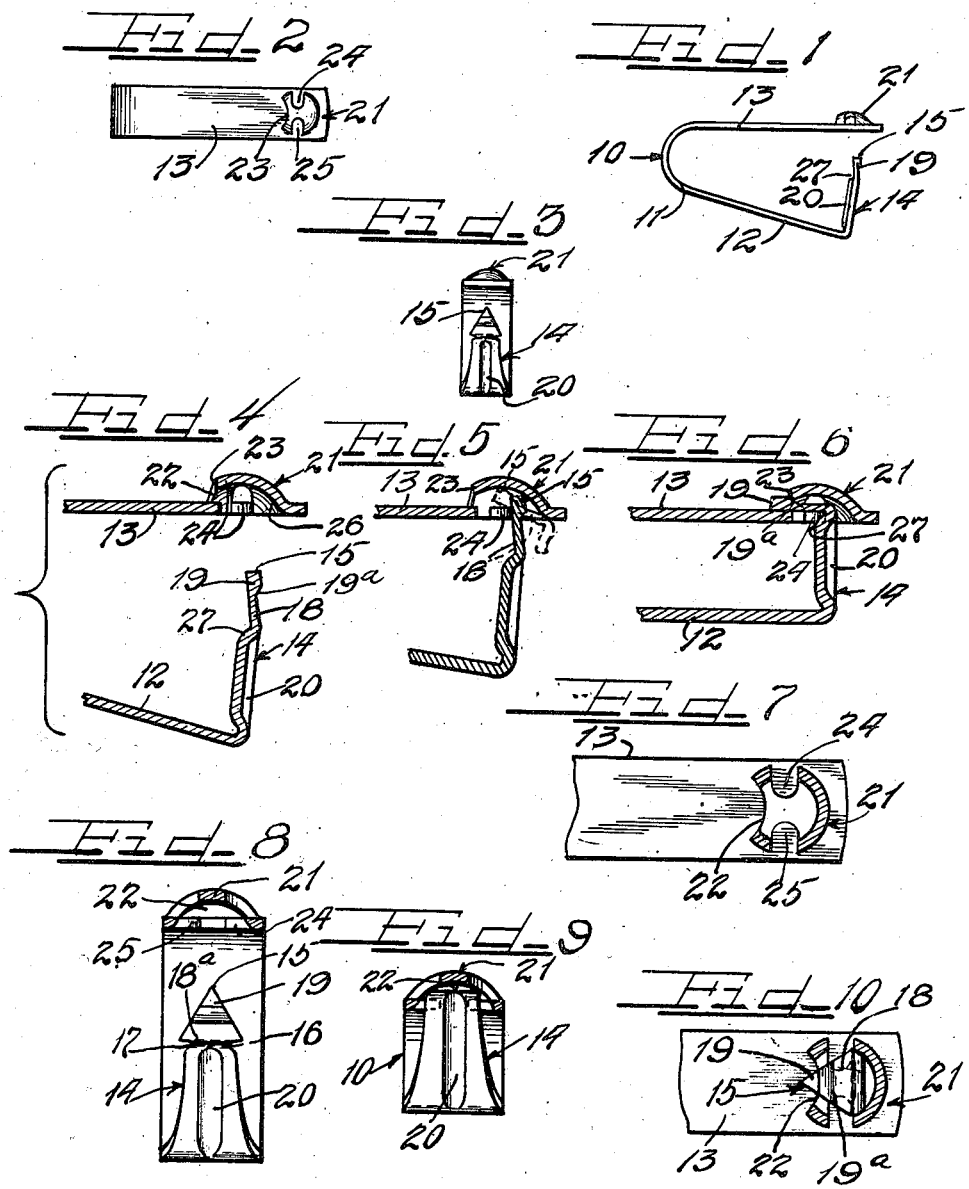

2,309,030

UNITED STATES PATENT OFFICE 2,309,030

IDENTIFICATION TAG

Phillip Daniel Wittlinger, Chicago, Ill., assignor to William Cooper & Nephews, Incorporated, Chicago, Ill., a corporation of Illinois Application September 9, 1940, Serial No. 355,994

8 Claims. (Cl. 40—3)

The present invention relates to marker bands or identification tags for application to fowl, animals or the like. More specifically, the invention relates to an animal tag which is automatically permanently locked with or without special tools by hand pressure, by a mere forcing together of the locking parts. It is to be understood, however, that the device illustrated and described herein is susceptible for attachment to articles and things of inanimate as well as of animate nature.

The device of this invention is of the type comprising a strip of metal bent to form two arms, the end of one of which is pointed for piercing the fowl or animal and the other end of which is provided with a capped apertured recess through which the pointed end is passed and locked for permanently connecting together the ends of the strip. The open cap will automatically bend the pointed end into locked position. The locked connection is of a permanent nature, and can only be unlocked by breaking the pointed end along a weakened line. This feature prevents fraudulent removal of a tag from an animal or fowl for reuse on another animal or fowl.

One of the objects of the present invention is to provide a self-piercing marker or tag which may be sealed against fraudulent or accidental removal.

Another object of this invention is the provision of a marker or tag, the ends of which may be permanently locked together with a portion of one end being weakened along a predetermined line for breaking the locked end if desired.

Another object of the invention is to provide a one-piece marker or tag having a double lock arrangement between the interlocking end portions.

A further object of the invention is to decrease accidental removal of markers or tags from animals or fowl by eliminating from the tag all corners, projections, or uneven parts which are readily engageable with a foreign object.

A still further object of the present invention is to provide a cheap, yet strong marker or tag of simple construction so as to be economically manufactured in quantity lots, readily applied and permanently locked without special tools, by hand pressure only.

The novel features believed to be characteristic of the present invention are set forth with particularity in the appended claims. The invention itself, however, both as to its organization and manner of construction, together with further objects and advantages thereof, may best be understood by reference to the following description taken in connection with the accompanying drawing, in which:

Figure 1 illustrates a side elevational view of an unlocked identification tag embodying principles of the present invention;

Figure 2 is a plan view looking down on the identification tag illustrated in Figure 1;

Figure 3 is an end view, as seen when looking from the right, of the unlocked identification tag illustrated in Figure 1;

Figure 4 is an enlarged fragmentary vertical cross-sectional view illustrating the relation of the locking ends of the identification tag shown in Figure 1;

Figure 5 is a view similar to Figure 4 illustrating, in full lines, the initial engagement between the locking ends when forced together and, in dotted lines, the manner in which the pointed end will automatically feed into locking position upon the application of additional locking force;

Figure 6 is a view similar to Figure 4 illustrating the relation of parts when the ends of the identification tag are locked together;

Figure 7 is an enlarged fragmentary plan view, similar to Figure 2, showing the locking cap in horizontal cross section with its top portion cut away;

Figure 8 is an enlarged end view similar to Figure 3 showing the locking cap in transverse vertical cross section;

Figure 9 is a view similar to Figure 8 showing the relation of parts when the identification tag is in locked position; and Figure 10 is a view similar to Figure 7 showing the relation of the ends of the identification tag when locked together.

The identification tag 10 embodying principles of this invention consists of a metal strip 11 bent flatwise into a substantially U-shape to form flat side legs 12 and 13 joined by a rounded base to impart resiliency to the legs.

As best shown in Figures 1, 3, 4 and 8, the free end of the leg 12 has an upstanding end portion 14 extending toward the other leg 13. The terminal of the upstanding portion 14 is spear shaped to provide a piercing head or tip 15 partially isolated from the portion 14 by recesses 16 and 17 in the side edges of the portion 14 which define the base of the spear. The head 15 is swedged to thin down the metal at 18 adjacent the recesses 16 and 17 and to form a thickened pointed end or lump 19 merging into the thinned portion 18 along a sloping shoulder 19a. The spear head 15 is thus joined to the portion 14 along a weakened line 18a between the recesses 16 and 17.

A longitudinally extending indented portion 20 is provided on the portion 14 between the weakened line 18a and the junction with the leg 12 to form a reinforcing or stiffening rib which prevents the portion 14 below the head 15 from bending when the ends of the strip are forced into interlocking engagement.

The free end portion of the leg 13 is stamped to form an opened dome thereon which provides an outwardly curved cap portion or housing 21. As best shown in Figures 4, 7 and 8, the housing 21 terminates in an opening 22 whose edges define a plane in angular relation to the plane of the leg 13. The opening 22 faces away from the end of the leg 13 and is defined by the outer face of the leg 13 and the curved edge 23, on the cap or housing 21, which extends above the plane of the leg 13. A pair of inwardly facing and laterally extending ears or lugs 24 and 25 are struck downwardly from the top of the housing 21 to lie in the plane of the leg 13.

The identification tag illustrated in Figure 1 is in an unlocked position with details of the construction of the ends of the legs 12 and 13 being more clearly shown in the cross-sectional view of Figure 4. Figures 6, 9 and 10 illustrate the identification tag in a locked position.

To interlock the ends of the identification tag, it is only necessary to apply force for urging the piercing tip 15 of the reinforced leg 14 into the curved open housing 21 as illustrated in Figure 5. This interlocking force is utilized to pierce the ear of an animal or the wing of a fowl or other similar object so that the piercing head 15 extends therethrough and engages against the inner curved surface 26 of the housing 21. When sufficient pressure is exerted, the piercing head 15 enters the housing opening to the right of the ears 24 and 25 and bends while geared by the curved surface 26 around the ears until the pointed end portion of the head extends through the opening 22 to lie flush with the outer surface of the leg 13, as shown in Figure 6. The total bending of the head 15 is about 90° and automatically occurs along the weakened line 18a. The head 15 can initially be somewhat offset from the portion 14 as shown in Figure 4 to facilitate the bending operation. When the ends of the tag are interlocked as shown in Figure 6, the shoulder 19a engages against the opening edge 23 to lock the thickened pointed end 19 beyond the housing. It will be noted that the reinforcing portion 20 offers resistance to the collapse of the leg 14 when pressure is applied for interlocking the ends of the tag.

A double locking arrangement is provided by the identification tag illustrated. One locking arrangement is provided by the upper shoulder 27 of the reinforcing indentation 20 and the reduced portion 18 engaging opposite faces of the ears or lugs 24 and 25 to clamp the same therebetween while a second locking arrangement is provided by the engagement between the shoulder 19a and the opening edge 23.

If metal stock having sufficient resiliency is used, the opening 22 defined by the curved edge 23 can be made high enough to tightly receive therein the reduced portion 18, the inherent resiliency of the metal tending to exert a constant force against the shoulder 19 to resist movement of the piercing tip in a direction in which the ends of the members are pulled apart. However, if metal having insufficient resiliency is used, then it is necessary to exert a downward pressure on the open housing 21 adjacent the edge 23 to insure a proper seat between the metal at the edge and the reduced portion for exerting the necessary force against the shoulder 19.

In the former case, mere hand pressure is sufficient to lock the tag ends together while in the latter a special tool may be used provided the downward pressure to be exerted on the open housing is greater than can be applied by the hand only.

The identification tag herein illustrated and described is capable of having its ends interlocked either by hand pressure or by the use of a punch mechanism to exert the forces herein described.

Although the interlocked relation between the ends of the identification tag herein illustrated and described is more or less of a permanent nature, preventing the accidental removal of the tag from an object to which it is secured, provision is made along the bending line defined by the edge shoulders 16 and 17, which is intentionally weakened at 18a, to break off the head 15 at this point if it is desired to remove the tag from the object to which it is locked.

The tags herein illustrated have not been provided with any marking or identification indicia as it is presumed that the user will apply whatever indicia he desires to such markers or tags.

By making the open housing 21 curved with the extended piercing head 15 lying in flush relation with the outer surface of the leg 13, the possibility of projections catching on foreign objects such as grass, branches of trees, or wire of a fence or the like when the marker is applied to an animate object, is eliminated.

It is apparent from the foregoing description that an identification tag or marker is provided, the ends of which are arranged to automatically double interlock without the formation of any projections which might catch on foreign objects and which is permanently sealed but may be broken if desired thus permanently destroying the tag and preventing its reuse.

While a particular embodiment only of this invention has been illustrated, it will of course, be understood that the invention should not be limited thereto, since many modifications may be made and therefore, it is contemplated by the appended claims to cover all such modifications as fall within the true spirit and scope of the present invention.

I claim as my invention:

1. A one-piece self-locking clip comprising a bent metal strip having a domed recess struck out from one free end portion thereof and a piercing head on the other free end portion integrally joined to said other free end along a weakened area, spaced opposed ears struck down into the recess from the dome, said head being insertable into said recess between said ears and said dome and guided by the dome to a bent position overlying the ears for locking the free ends together, and said weakened area being rupturable to sever the head upon reverse bending of the head to unlock the ends.

2. An identification and sealing tag comprising a bent metal strip, one end of said strip having a portion struck outwardly from the plane of said strip and terminating in an opening, a pair of ears struck in from said portion and lying in the plane of said strip, the other end of said strip having a sharpened end and a longitudinally reinforced portion adjacent thereto, said sharpened end having a transverse shoulder spaced from its point, said sharpened end being arranged for insertion around said ears to project through said opening with the shoulder engaging the forward edge of said opening.

3. An identification and sealing tag comprising a bent metal strip having a slotted capped apertured portion at one end with lugs struck out from the cap and lying in the plane of the strip, a piercing point at the other end of the strip joined to the strip along a weakened line, said piercing point having a shoulder on its outer surface spaced from its extremity, said piercing point being insertable into the aperture and bendable along the weakened line by the cap to lie over the lugs and extend through the slot with said shoulder engaging an edge of said slot to resist pulling apart of the interlocked ends.

4. A self-locking one-piece clip comprising a generally U-shaped metal strip having a domed recess struck outwardly from one free end thereof, a pair of ears struck in from the dome, a base portion on the other free end extending toward the domed recess, a spearhead on the free end of the base and a reinforcing rib on the base terminating in a shoulder adjacent the spearhead, said spearhead being insertable in said recess and guided by the dome into a bent position over the ears whereby the ears will be clamped between the spearhead and shoulder.

5. An identification and sealing tag comprising a metal strip bent to form a plurality of flat faces in bracing relation with the ends of said strip facing each other at right-angles, one end of said strip having a domed recess terminating in an opening whose edges define a plane angularly disposed from the plane of the strip, the other end of the strip having a piercing point with a reduced portion spaced from its extremity defining at one end thereof a shoulder and at its other end a bending line, means connected to and underlying said dome for together therewith defining a guide for said piercing point, said piercing point being arranged to extend through said opening by bending along said bending line and to lie flush with the outer surface of said first mentioned strip end, and said shoulder engaging an edge of said opening to resist separation of the interlocked ends.

6. An identification and sealing tag comprising a metal strip bent to form a plurality of flat faces in bracing relation with the end portions of the strip defining a pair of said faces in right-angular relation, one end of said strip having an outwardly curved domed portion terminating in an opening facing away from the end of the strip with the edges of the opening defining a plane angularly disposed from the plane of the strip, a pair of ears struck in from said domed portion and facing each other in the plane of said strip, the other end of said strip having a sharpened piercing tip, a reinforcing rib on said other strip end adjacent said piercing tip and terminating in a shoulder, said piercing tip having a portion of reduced thickness defining an additional shoulder spaced from the tip extremity, a weakened portion between said shoulders, said piercing tip being bendable along said weakened portion to extend through said opening and to lie flush with the top surface of said ears and the outer surface of the strip adjacent thereto, with said rib shoulder engaging the under surface of said ears, and the shoulder on said tip engaging an outer edge of said opening to further interlock the ends.

7. An identification and sealing tag comprising a bent metal strip having one end sharpened and a portion of reduced thickness adjacent its extremity to provide a piercing tip with abutment shoulders on opposite sides thereof and having near its other end an outwardly curved cap portion terminating in an opening facing away from its extremity, means struck from the sides of said cap and disposed toward the longitudinal center of the strip in non-abutting relationship and in the plane of said strip to underlie said cap portion for, together with said cap, defining a narrow piercing tip guiding slot, said means and cap guiding the piercing tip, when the latter is forced against the cap, through said opening, said reduced portion seating within said opening with the abutment shoulders on said piercing tip engaging the forward edge of said opening to lock together the strip ends.

8. An identification and sealing tag comprising a sheet metal strip having a narrowed piercing head at one end and a partially circular protrusion adjacent the other end opening into a face of the strip, said protrusion extending outwardly from the plane of said strip, and members struck from the sides of said partially circular protrusion to afford a portion in said protrusion disposed longitudinally on the strip to guide said tip, said members extending inwardly from the side walls of said protrusion to underlie the same from guiding the piercing head to a position overlying said means and the face of the strip.

PHILLIP DANIEL WITTLINGER.